United States Patent
Choi et al.

(10) Patent No.: US 9,468,024 B2
(45) Date of Patent: *Oct. 11, 2016

(54) METHOD AND APPARATUS FOR RANGING TRANSMISSION BY MOBILE STATION IN WIRELESS COMMUNICATION SYSTEM

(75) Inventors: Jinsoo Choi, Anyang-si (KR); Youngsoo Yuk, Anyang-si (KR); Hangyu Cho, Anyang-si (KR); Jinsam Kwak, Anyang-si (KR); Kiseon Ryu, Anyang-si (KR); Jin Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 294 days.

This patent is subject to a terminal disclaimer.

(21) Appl. No.: 14/124,192

(22) PCT Filed: Mar. 23, 2012

(86) PCT No.: PCT/KR2012/002117
§ 371 (c)(1),
(2), (4) Date: Dec. 5, 2013

(87) PCT Pub. No.: WO2013/002474
PCT Pub. Date: Jan. 3, 2013

(65) Prior Publication Data
US 2014/0098667 A1    Apr. 10, 2014

Related U.S. Application Data

(60) Provisional application No. 61/536,519, filed on Sep. 19, 2011, provisional application No. 61/532,531, filed on Sep. 8, 2011, provisional application No. 61/504,314, filed on Jul. 5, 2011, provisional (Continued)

(51) Int. Cl.
*H04W 74/08*    (2009.01)

(52) U.S. Cl.
CPC ................... *H04W 74/085* (2013.01)

(58) Field of Classification Search
None
See application file for complete search history.

(56) References Cited

U.S. PATENT DOCUMENTS

| 9,143,225 B2 * | 9/2015 | Choi ............... H04W 74/085 |
| 2009/0097456 A1 * | 4/2009 | Zhu ............... H04W 74/085 370/336 |
| 2010/0195664 A1 | 8/2010 | Ho | |

FOREIGN PATENT DOCUMENTS

| CN | 1549610 | 11/2004 |
| CN | 1713607 | 12/2005 |
| JP | 2006-526308 A | 11/2006 |
| JP | 2008-532350 A | 8/2008 |

(Continued)

OTHER PUBLICATIONS

Jaesun Cha, et al., "Distribution of Ranging Accesses from M2M Devices During Network Reentry", IEEE 802.16 Broadband Wireless Access Working Group, IEEE C802.16p-11/0075, May 8, 2011.

(Continued)

*Primary Examiner* — Ayaz Sheikh
*Assistant Examiner* — Sori Aga
(74) *Attorney, Agent, or Firm* — Dentons US LLP

(57) ABSTRACT

Disclosed is a ranging transmission method comprising: a mobile station receiving a message including backoff window information from a base station; and the mobile station performing ranging transmission on the basis of the backoff window information, wherein the backoff window information comprises information indicating a size $K_0$ of a 0-th backoff window, wherein a size $K_x$ of a nx-th (x being a non-negative integer) backoff window is determined according to $K_x = K_0/(2^x)$ wherein x denotes a ranging retry count.

6 Claims, 7 Drawing Sheets

Related U.S. Application Data application No. 61/504,296, filed on Jul. 4, 2011, provisional application No. 61/504,230, filed on Jul. 3, 2011, provisional application No. 61/502,876, filed on Jun. 30, 2011, provisional application No. 61/502,875, filed on Jun. 30, 2011.

(56) References Cited

FOREIGN PATENT DOCUMENTS

| KR | 1020080054987 | 6/2008 |
|----|---------------|--------|
| WO | 2010/080362 A1 | 7/2010 |

OTHER PUBLICATIONS

Jin Lee, et al., "Ranging contention resolution for M2M device", IEEE 802.16 Broadband Wireless Access Working Group, IEEE C802.16p-11/0100r1, May 13, 2011.

Jin Lee, et al., "Network Access Surge indication", IEEE 802.16 Broadband Wireless Access Working Group, IEEE C802.16p-11/0098r1, May 16, 2011.

Erik Colban, et al., "Random Access Throttling", IEEE 802.16 Broadband Wireless Access Working Group, IEEE C802.16p-11/0112, May 8, 2011.

\* cited by examiner

METHOD AND APPARATUS FOR RANGING TRANSMISSION BY MOBILE STATION IN WIRELESS COMMUNICATION SYSTEM

This application is a 35 USC §371 National Stage entry of International Application No. PCT/KR2012/002117 filed on Mar. 23, 2012, and claims priority of U.S. Provisional Application Nos. 61/502,875, filed Jun. 30, 2011, 61/502,876, filed Jun. 30, 2011, 61/504,230, filed Jul. 3, 2011, 61/504,296, filed Jul. 4, 2011, 61/504,314, filed Jul. 5, 2011, 61/532,531 filed Sep. 8, 2011, 61/536,519 filed Sep. 19, 2011, each of which are hereby incorporated by reference in its entirety.

TECHNICAL FIELD

The present invention relates to wireless communication, and more particularly, to a method and apparatus for ranging transmission by a mobile station in a wireless communication system.

BACKGROUND ART

Ranging is a procedure by which a mobile station adjusts transmission parameters (frequency offset, time offset and transmit power) for uplink communication with a base station when the mobile station performs network re-entry and network entry.

Specifically, a ranging procedure is used for the following four purposes: initial ranging, handover ranging, periodic ranging and bandwidth request ranging. Initial ranging refers to a process of uplink time synchronization (i.e., time and frequency synchronization) when a user equipment attempts initial network entry. Handover ranging refers to a process of establishing initial synchronization between a user equipment and a target base station when the user equipment hands over from a source base station to the target base station. Periodic ranging is used for a user equipment to periodically update uplink synchronization. Bandwidth request ranging is used for a user equipment to request an uplink resource to a base station.

When a mobile station attempts to enter a network, the mobile station selects a ranging channel, selects a ranging code, and transmits the selected ranging code to a base station through the selected ranging channel. Upon receipt of the ranging code, the base station transmits, to the mobile station, a message representing that the ranging code has been successfully received.

The number of mobile stations entering a network increases as communication technologies develop. When lots of mobile stations in an idle state attempt network entry/re-entry, access collision and access congestion occur, resulting in deterioration of communication performance. Accordingly, a method for solving this problem is needed.

DISCLOSURE

Technical Problem

An object of the present invention is to provide a method and apparatus by which a mobile station communicates with a base station.

Another object of the present invention is to provide a method and apparatus by which a base station communicates with a mobile station.

Another object of the present invention is to provide a mobile station communicating with a base station.

Another object of the present invention is to provide a base station communicating with a mobile station.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a ranging transmission method comprising: a mobile station receiving a message including backoff window information from a base station; and the mobile station performing ranging transmission on the basis of the backoff window information, wherein the backoff window information comprises information indicating a size $K_0$ of a 0-th backoff window, wherein a size $K_x$ of a nx-th (x being a non-negative integer) backoff window is determined according to $K_x=K_0/(2^x)$ wherein x denotes a ranging retry count.

To further achieve these and other advantages and in accordance with the purpose of the present invention, a method for receiving ranging transmission from a mobile station, comprising: a base station transmitting a message including backoff window information to the mobile station; and the base station performing a ranging procedure with the mobile station on the basis of the backoff window information, wherein the backoff window information comprises information indicating a size $K_0$ of a 0-th backoff window, wherein a size $K_x$ of a nx-th (x being a non-negative integer) backoff window is determined according to $K_x=K_0/(2^x)$ wherein x denotes a ranging retry count.

To further achieve these and other advantages and in accordance with the purpose of the present invention, a mobile station configured to perform ranging transmission to a base station in a wireless communication system, the mobile station comprising: a receiver; a transmitter; and a processor configured to control the receiver, wherein the processor is configured to control the receiver to receive a message including backoff window information from the base station and to perform a ranging procedure on the basis of the backoff window information, wherein the backoff window information comprises information indicating a size $K_0$ of a 0-th backoff window, wherein the processor is configured to determine a size $K_x$ of a nx-th (x being a non-negative integer) backoff window according to $K_x=K_0/(2^x)$ wherein x denotes a ranging retry count.

To further achieve these and other advantages and in accordance with the purpose of the present invention, a base station configured to receive ranging transmission from a mobile station in a wireless communication system, the base station comprising: a receiver; a transmitter; and a processor configured to control the receiver and the transmitter, wherein the processor is configured to control the transmitter to transmit a message including backoff window information to the mobile station and to perform a ranging procedure with the mobile station on the basis of the backoff window information, wherein the backoff window information comprises information indicating a size $K_0$ of a 0-th backoff window, wherein a size $K_x$ of a nx-th (x being a non-negative integer) backoff window is determined according to $K_x=K_0/(2^x)$ wherein x denotes a ranging retry count.

Preferably, the ranging transmission method according to claim 1, wherein the message is a paging message.

Preferably, the ranging transmission method according to claim 1, wherein the size $K_0$ of the 0-th backoff window is greater than 2.

Advantageous Effects

According to the present invention, a mobile station can rapidly and efficiently perform network re-entry while minimizing its influence on other mobile stations in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

In the drawings.

MODE FOR INVENTION

Figure 1:
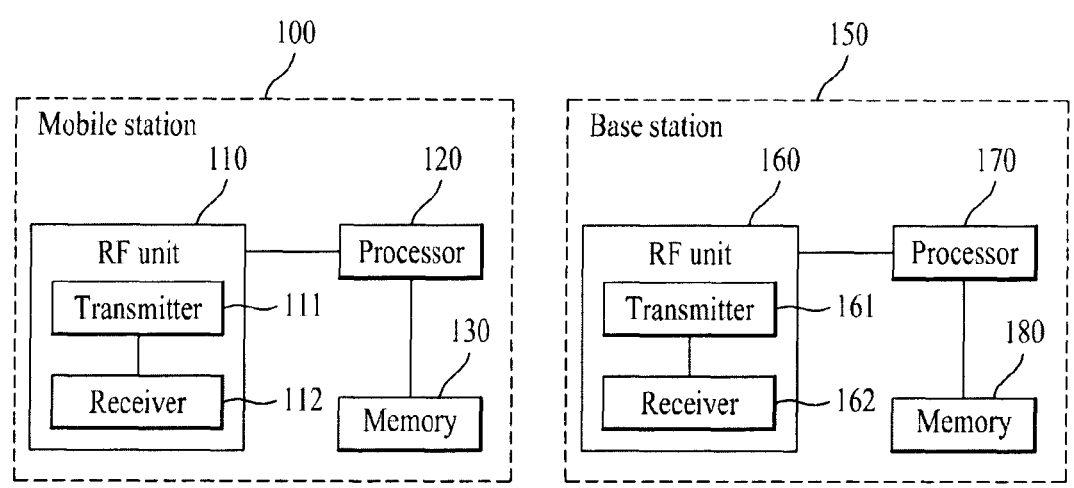
FIG. 1 is a block diagram of a mobile station and a base station according to an embodiment of the present invention.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. For example, while the following detailed description includes specific details in order to provide a thorough understanding of the present invention, it will be apparent to those skilled in the art that the present invention may be practiced without such specific details. For example, the following detailed description is given under the assumption that a 3GPP LTE mobile communication system is being used. However, the description is applicable to any other mobile communication system except for specific features inherent to the 3GPP LTE system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), an Advanced Mobile Station (AMS), etc. and the term 'Base Station (BS)' is assumed to refer to any node of a network end, such as a Node B, an enhanced Node B (eNB or eNode B), an Access Point (AP), etc., communicating with a UE. The present invention focuses on the IEEE 802.16m. However, technical features of the present invention are applicable to other communication systems such as 3 GPP LTE, LTE-A, etc.

In the present invention, M2M (Machine to Machine) communication means information exchange between mobile stations via a base station or between a base station and mobile stations without user intervention. In view of this, an M2M device means a mobile station capable of supporting M2M communication. An access service network for M2M service is defined as an M2M access service network (ASN) and a network entity communicating with M2M devices is called an M2M server. The M2M server executes an M2M application and provides an M2M specific service for one or more M2M devices. An M2M feature means a feature of the M2M application, and one or more features may be necessary to provide the application. An M2M device group represents a group of M2M devices which share one or more common features. A device which performs communication according to the M2M scheme, described above, can be referred to as various terms such as an M2M device, M2M communication device, machine type communication (MTC) device, etc. For convenience of explanation, a conventional mobile station is referred to as a human type communication (HTC) mobile station or human-to-human (H2H) device to be distinguished from the M2M device in the following description.

As the number of machine application types increases, the number of M2M devices gradually increases in a specific network. Machine application types under discussion include (1) security, (2) public safety, (3) tracking and tracing, (4) payment, (5) healthcare, (6) remote maintenance and control, (7) metering, (8) consumer device, (9), point of sales (POS) and fleet management in a security associated application market, (10) M2M communication of vending machines, (11) remote monitoring of machine and equipment, and smart meter for measuring operating time of construction machine equipment and automatically metering heat or electricity consumption, (12) surveillance video communication of security cameras, etc. However, the machine application types are not limited thereto and other various machine application types are under discussion. As the number of machine application types increases, the number of M2M devices can rapidly increase over the number of H2H devices.

A lot of M2M devices located in a single base station may cause access congestion among the M2M devices and existing devices, that is, H2H devices, and access collision between M2M devices. This requires a discussion about how to efficiently distribute restricted resources to new M2M devices while minimizing the influence on existing mobile stations (H2H devices). In other words, when a plurality of M2M devices employ the procedure of re-entering a network from an idle mode, which is applied to the existing mobile stations, that is, H2H devices, access congestion among the H2H devices and M2M devices occurs due to features of the M2M devices, and thus the network re-entry procedure needs to be partially modified.

A description will be given of an embodiment of the present invention for a case in which M2M communication is applied to IEEE 802.16m. However, the present invention is not limited thereto and embodiments of the present invention are applicable to other systems such as 3GPP LTE, etc. in the same manner.

FIG. 1 is a block diagram of a mobile station and a base station according to an embodiment of the present invention.

Referring to FIG. 1, a mobile station 100 and a base station 150 may respectively include RF units 110 and 160, processors 120 and 170, and optionally memories 130 and 180. The RF units 110 and 160 may respectively include transmitters 111 and 161 and receivers 112 and 162. In the mobile station 100, the transmitter 111 and the receiver 112 may be configured to transmit/receive signals to/from the base station 150 and other mobile stations and the processor 120 may be functionally connected with the transmitter 111 and the receiver 112 to control the transmitter 111 and the receiver 112 to transmit/receive signals to/from other apparatuses. In addition, the processor 120 may process a signal to be transmitted and then transmit the processed signal to the transmitter 111, and process a signal received by the receiver 112. If required, the processor 120 can store information included in an exchanged message in the memory 130. The mobile station 100 having this configuration can perform the following methods according to embodiments of the present invention. The mobile station 100 may include an additional configuration according to application type thereof, which is not illustrated in FIG. 1. If the mobile station 100 is used as a smart meter, the mobile station 100 can include an additional configuration for metering power. The mobile station 100 may perform a power metering operation under the control of the processor 120 shown in FIG. 1 or a separately configured processor (not shown).

While FIG. 1 illustrates communication between the mobile station 100 and the base station 150, a communication method according to the present invention may be performed between mobile stations. In this case, apparatuses of the mobile stations can have the same configuration as that of FIG. 1 and perform the following methods according to embodiments of the present invention.

In the base station 150, the transmitter 161 and the receiver 162 may be configured to transmit/receive signals to/from other base stations, an M2M server, mobile stations, and the processor 170 may be functionally connected to the transmitter 161 and the receiver 162 to control the transmitter 161 and the receiver 162 to transmit/receive signals to/from other apparatuses. In addition, the processor 170 may process a signal to be transmitted and then transmit the processed signal to the transmitter 161, and process a signal received by the receiver 162. If required, the processor 170 can store information included in an exchanged message in the memory 180. The base station 150 having this configuration can perform the methods according to the embodiments of the present invention.

The processors 120 and 170 of the mobile station 100 and the base station 150 respectively direct (control, adjust, manage, etc.) operations of the mobile station 100 and the base station 150. The processors 120 and 170 may be respectively connected to the memories 130 and 180 which store program codes and data. The memories 130 and 180 are connected to the processors 120 and 170 and store operating systems, applications, and general files.

The processors 120 and 170 may also be called controllers, microcontrollers, microprocessors, or microcomputers.

The processors 120 and 170 may be configured as hardware, firmware, software, or a combination thereof. When embodiments of the present invention are implemented using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) which are adapted to implement the present invention may be included in the processors 120 and 170.

On the other hand, if the embodiments of the present invention are implemented using firmware or software, the firmware or software may be configured to include a module, a procedure, a function, etc. which perform functions or operations according to the present invention. The firmware or software may be included in the processors 120 and 170, or stored in the memories 130 and 180 and invoked from the memories 120 and 170 by the processors 120 and 170.

Figure 2:
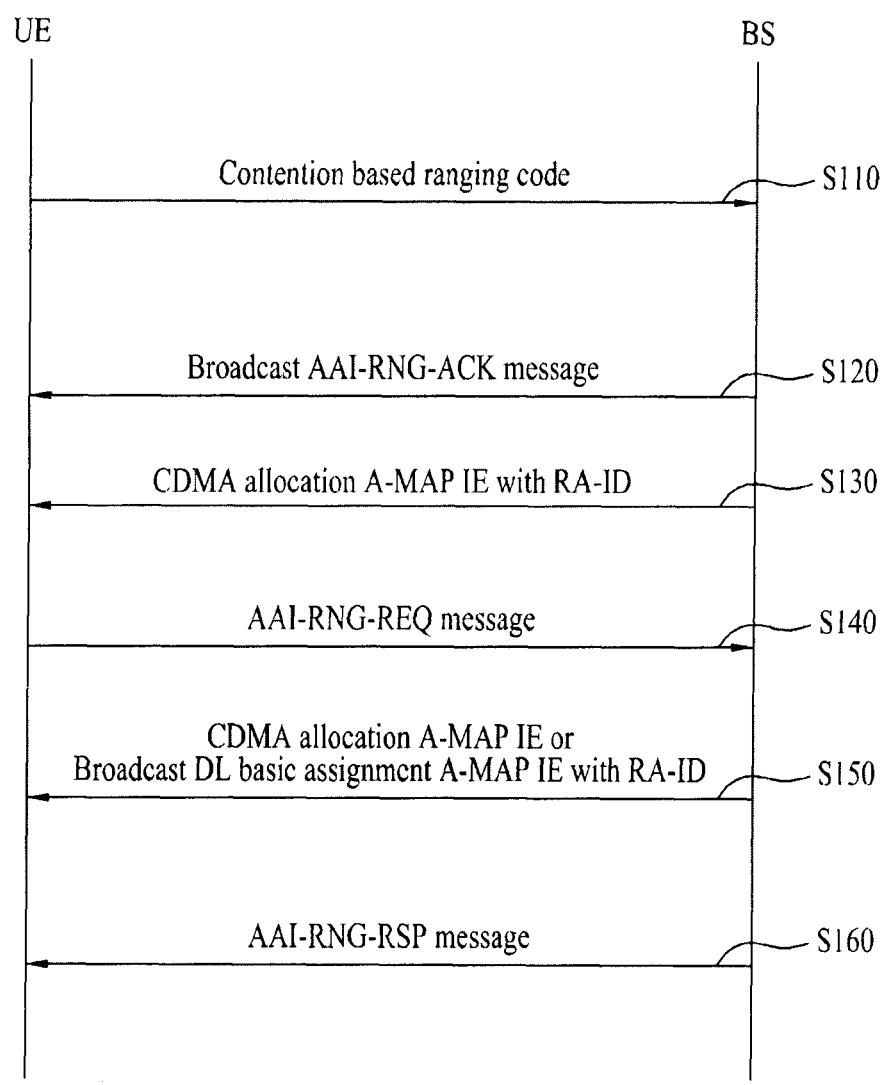
FIG. 2 illustrates a contention-based network re-entry procedure performed by a mobile station in an IEEE 802.16m system which is a wireless communication system.

FIG. 2 illustrates a contention-based network entry/re-entry procedure of a mobile station in an IEEE 802.16m system which is a wireless communication system.

In a ranging procedure for network entry/re-entry of the mobile station in the IEEE 802.16m system, the mobile station minimizes power in a paging unavailable interval and receives an AAI-PAG-ADV message transmitted from a base station in a paging listening interval. The AAI-PAG-ADV message includes the ID of a paging group to which the base station transmitting the message belongs, MAC address hash information indicating mobile stations which need location update or network entry/re-entry, and an action code describing a procedure which needs to be performed by each mobile station.

If traffic destined for a mobile station operating in an idle mode is present, the base station transmits the AAI-PAG-ADV message to the mobile station in the next paging listening interval. Upon receipt of the AAI-PAG-ADV message, the mobile station enters a normal mode from the idle mode.

A procedure through which a mobile station adjusts transmission parameters (frequency offset, time offset and transmit power) for uplink communication with a base station when performing network re-entry and network entry from an idle mode is called ranging.

Referring to FIG. 2, the mobile station acquires downlink synchronization and uplink transmission parameters and selects one ranging channel using random backoff. When the random backoff is used, the mobile station selects one available channel corresponding to a backoff window through a uniform random process. The random backoff uses a binary exponential algorithm in order to calculate the backoff window. Upon selection of the ranging channel, the mobile station selects a ranging code through a uniform random process. Then, the mobile station transmits the contention based ranging code to the base station through the selected ranging channel (S110). The base station transmits an AAI-RNG-ACK message to the mobile station in a broadcast manner when successfully receiving the ranging code (120). The AAI-RNG-ACK message corresponds to a response which represents that a ranging code has been successfully received and detected through a ranging channel. Furthermore, the base station masks a CDMA allocation A-MAP IE, which corresponds to uplink resource allocation information used for the mobile station to transmit an AAI-RNG-REQ message, with a random access identifier (RA-ID) and transmits the masked CDMA allocation A-MAP IE (S130). The mobile station transmits the AAI-RNG-REQ message to the base station through an uplink resource allocated thereto (S140). The base station transmits, to the mobile station, downlink resource allocation information by which an AAI-RNG-RSP message will be transmitted (S150). Here, the downlink resource allocation information may be transmitted to the mobile station through a CDMA allocation A-MAP IE or a broadcast DK basic assignment A-MAP IE, which is masked with an RA-ID. Subsequently, the mobile station can receive the AAI-RNG-RSP message through a downlink resource corresponding to the downlink resource allocation information (S160).

Figure 3:
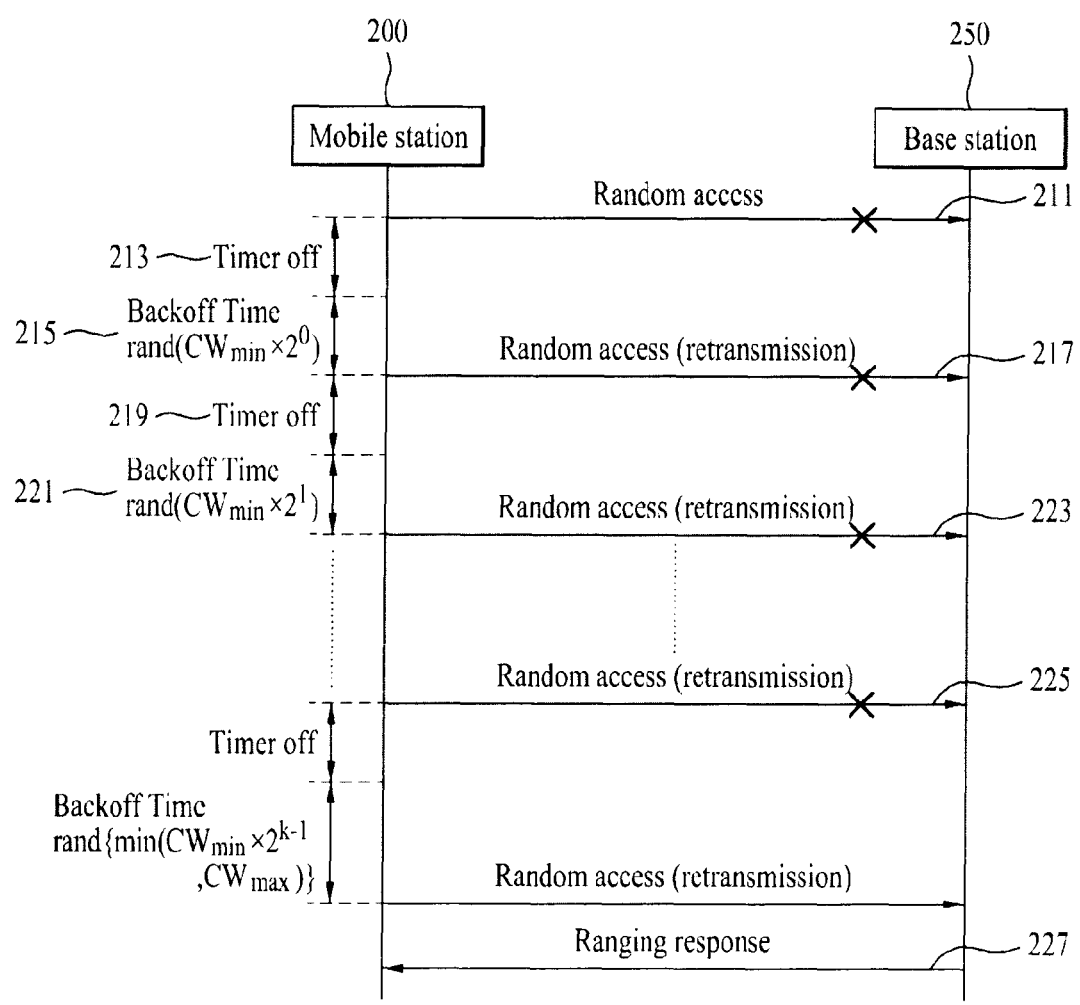
FIG. 3 is a flowchart illustrating a conventional broadband random access backoff method.

FIG. 3 illustrates a procedure by which a mobile station increases a backoff window size and performs contention based network re-entry in an IEEE 802.16m system which is a wireless communication system.

MAC layer of IEEE 802.16 defines a ranging channel. Sub-channels constituting the ranging channel are described in a UL-MAP message. Mobile stations are allowed to collide with each other on the ranging channel. In an IEEE 802.16 ranging subsystem, a plurality of mobile stations perform ranging using a code division multiple access (CDMA) random access protocol for simultaneous access. When a message to be transmitted from a mobile station to a base station is generated, a code is selected from a set of pseudo-noise (PN) codes, and the message is spread using the selected PN code and transmitted through CDMA.

In general, slotted ALOHA protocol is used as a random access protocol of a mobile station. According to the slotted ALOHA protocol, a mobile station performs slot-based immediate access in order to access a base station. Accordingly, data is successfully transmitted when a single mobile station attempts to access a base station through one slot whereas data transmission fails due to collision when two or more mobile stations attempt to access the base station through the same slot. When data transmission fails, a mobile station attempts to access the base station after waiting for a predetermined time. If mobile stations, which have failed in data transmission, attempt to access the base station after waiting for the same time, data transmission fails again due to collision therebetween. To avoid this continuous collision, a binary exponential backoff (referred to as 'BEB' hereinafter) algorithm, which is a mobile station backoff algorithm, is employed. The BEB algorithm determines a backoff window for retransmission on the basis of the number of collisions of each mobile station. The backoff window (or contention window) in the BEB algorithm includes a minimum contention window and a maximum contention window.

The exponential backoff algorithm is a widely used collision resolution algorithm. The exponential backoff algorithm attempts to access a randomly selected channel within a contention window for retransmission. The size of a contention window exponentially increases according to the number of collisions. According to BEB, a mobile station, which senses collision, increases the size of a contention window with an exponent of 2. The mobile station randomly determines a ranging transmission time within the contention window with the exponentially increasing size. For example, a contention window of a mobile station which is subjected to collision during the first transmission trial has a size of 8, the mobile station determines a ranging transmission time within 8 frames starting from the current channel for the second transmission trial. If 5 is selected, the mobile station attempts ranging transmission at the fifth channel. Here, 5 corresponds to a backoff value or selected ranging opportunity. When collision occurs again, a collision count becomes 2 and the size of the backoff window for retransmission, which is the contention window, becomes 16. Then, the third transmission trial is randomly determined within 16 frames starting from the collision occurrence time. That is, collision continuously occurs, the system recognizes that load has increased and reduces the system load due to retransmission at the current time by increasing the size of the backoff window corresponding to the contention window to thereby resolve the collision. However, a mobile station subjected to a plurality of collisions continuously exponentially increases the contention window size even when other mobile stations do not use a radio band occupied by the mobile station, resulting in remarkable transmission latency.

Referring to FIG. 3, initial data to be transmitted from a mobile station 200 to a base station 250 is immediately delivered from the mobile station 200 to the base station 250 (211). In the above-mentioned random access scheme, messages can be transmitted using the same PN code through the same slot. In this case, messages transmitted from a plurality of mobile stations collide with each other. Mobile stations which have transmitted messages operate timers (213). The base station 250 transmits a ranging response message to the mobile stations upon receipt of the messages. When the mobile stations do not receive the ranging response message within a predetermined time, the mobile stations consider that the transmitted messages are subjected to collision and execute the BEB algorithm. Since collision occurs once, an arbitrary integer is selected in a backoff period (215) of $CW_{min} X 2^0$. This integer becomes backoff time (215), that is, ranging opportunity. The mobile stations retransmit messages after waiting for the backoff time (217). Here, CW (Competition Window) means a contention window size and may refer to a backoff window size. $CW_{min}$ denotes an initial backoff window size and $CW_{max}$ denotes an available maximum backoff window size. Retransmission is performed in the same manner as the initial transmission. The mobile stations operate the timers (219), and determine backoff time through the BEB algorithm when they do not receive the ranging response message within the predetermined time. Because collision occurs twice, an arbitrary integer is selected in a backoff period (221) of $CW_{min} X 21$. This integer becomes backoff time (221). The mobile stations retransmit messages after waiting for the backoff time (223).

$$CW = CW_{min} \times 2^x \qquad \text{[Math Figure 1]}$$

The backoff period increases as the number of collisions increases (225). This backoff period cannot exceed $CW_{max}$, and thus the backoff period corresponds to min($CW_{min}*2^{k-1}, CW_{max}$). Here, k denotes the number of collisions. The IEEE 802.16 system limits the maximum number of collisions to 15. In this case, $CW_{max}$ can have a value of $CW_{min}*2^{14}$ Data is successfully transmitted when the ranging response message is received from the base station (227) within 15 transmission attempts and data is abandoned when the sixteenth collision occurs. When the number of mobile stations which share the same channel in a wireless network increases, collision between mobile stations is inevitable because the mobile stations may simultaneously transmit messages because they do not know when other mobile stations start to transmit messages. To reduce this inevitable collision, the random access protocol uses the BEB algorithm as described above. The BEB algorithm sets a backoff period according to the number of collisions of each mobile station and determines a backoff time in the set backoff period. Each mobile station immediately transmits a message after waiting for the determined backoff time. When collision occurs again, the aforementioned procedure is repeated. The backoff period increases as the number of collisions increases.

The BEB algorithm distributes mobile stations efficiently when the number of mobile stations is small compared to radio channel capacity. However, a single mobile station rarely attempts to access a radio channel when the number of mobile stations increases, and all radio resources may not be used if the number of mobile stations further increases. That is, the BEB algorithm is not suitable when the number of mobile stations which access one radio channel increases. The current trend is an increase in using M2M devices, causing an increase in the number of mobile stations which access one radio channel.

The majority of conventional communication has been human-to-human (H2H) communication using user devices via a base station. However, the development of communication technology enables M2M communication. M2M communication means communication between electronic devices. While M2M communication means wired or wireless communication between electronic devices in a broad sense, it generally represents wireless communication between electronic devices.

Although M2M communication was recognized as remote control or telematics and the market therefor was very limited in the early nineties when M2M communication was introduced, M2M communication has grown rapidly in past years to create an attention-drawing market abroad as well as domestically. Furthermore, as application types of M2M devices are diversified, lots of M2M devices will be present in the same base station. When a lot of M2M devices in an idle state attempt network re-entry, numerous access collisions and access congestion may occur and communication performance may be deteriorated. However, there has yet to be proposed a network re-entry procedure of M2M devices in an idle state, which have features different from conventional mobile stations (H2H devices).

When the number of mobile stations increases, the number of mobile stations which attempt to access a system also increases. However, little mobile station successfully accesses the system using the BEB algorithm, as described above. In other words, the system becomes unstable. The BEB algorithm cannot rapidly recover the unstable system. Furthermore, according to the BEB algorithm, a mobile station which performs initial ranging and a mobile station subjected to several collisions compete against each other in the same slot.

While the mobile station subjected to several collisions needs to access the system prior to the mobile station which performs initial ranging, the mobile station subjected to several collisions suffers long latency due to a backoff period rapidly increased due to a binary exponent increase. This is called 'fairness problem'.

The number of collisions of a mobile station which has successfully accessed the system is initialized to '0'. When the number of mobile stations which attempt to access the system increases, a latent collision problem wherein collision probability further increases when successful mobile stations re-access the system is encountered.

Therefore, the conventional BEB algorithm has problems that a radio channel state cannot be considered when a backoff time is determined, efficiency is rapidly deteriorated when the number of mobile stations increases, and a system unstable state cannot be rapidly recovered, in addition to fairness problem and latent collision problem. To solve these problems, the present invention proposes a method of determining a window size for retransmission when initial ranging transmission fails. The method of setting an appropriate window size, proposed by the present invention, will now be described. According to the method of the present, an initial backoff window size can be determined in consideration of the number of mobile stations which attempt to access a base station and a mobile station group rather than being determined by a mobile station without the control of the base station, and the base station can transmit information required to determine the backoff window to mobile stations. Accordingly, each mobile station can perform random access within the initial backoff window size, signaled by the base station, according to the mobile station group to which each mobile station belongs. The base station can transmit an initial backoff window size parameter to the mobile stations on the basis of the number of mobile stations which successfully access the base station in one frame and the number of access attempts.

A first method proposed by the present invention maintains a backoff window size. According to the first method, a base station provides a backoff window size to be used by mobile station(s) to the mobile station(s).

Since ranging access trials are distributed in such a manner that most ranging access trials are concentrated on earlier opportunity, it is difficult to ensure successfulness of ranging access. In other words, it is necessary to distribute access loads within a specific window size considering that the access loads are concentrated into preceding frames within the backoff window. If one random access is allowed in one frame to enable ranging, almost all mobile stations fail in accessing a base station in the first random access procedure.

To solve this, the base station can download information about the specific window size to a mobile station such that the mobile station can randomly select a ranging channel within the specific window size. The successfulness of ranging trail of an M2M device depends on how the specific window size is set for every ranging trail.

Figure 4:
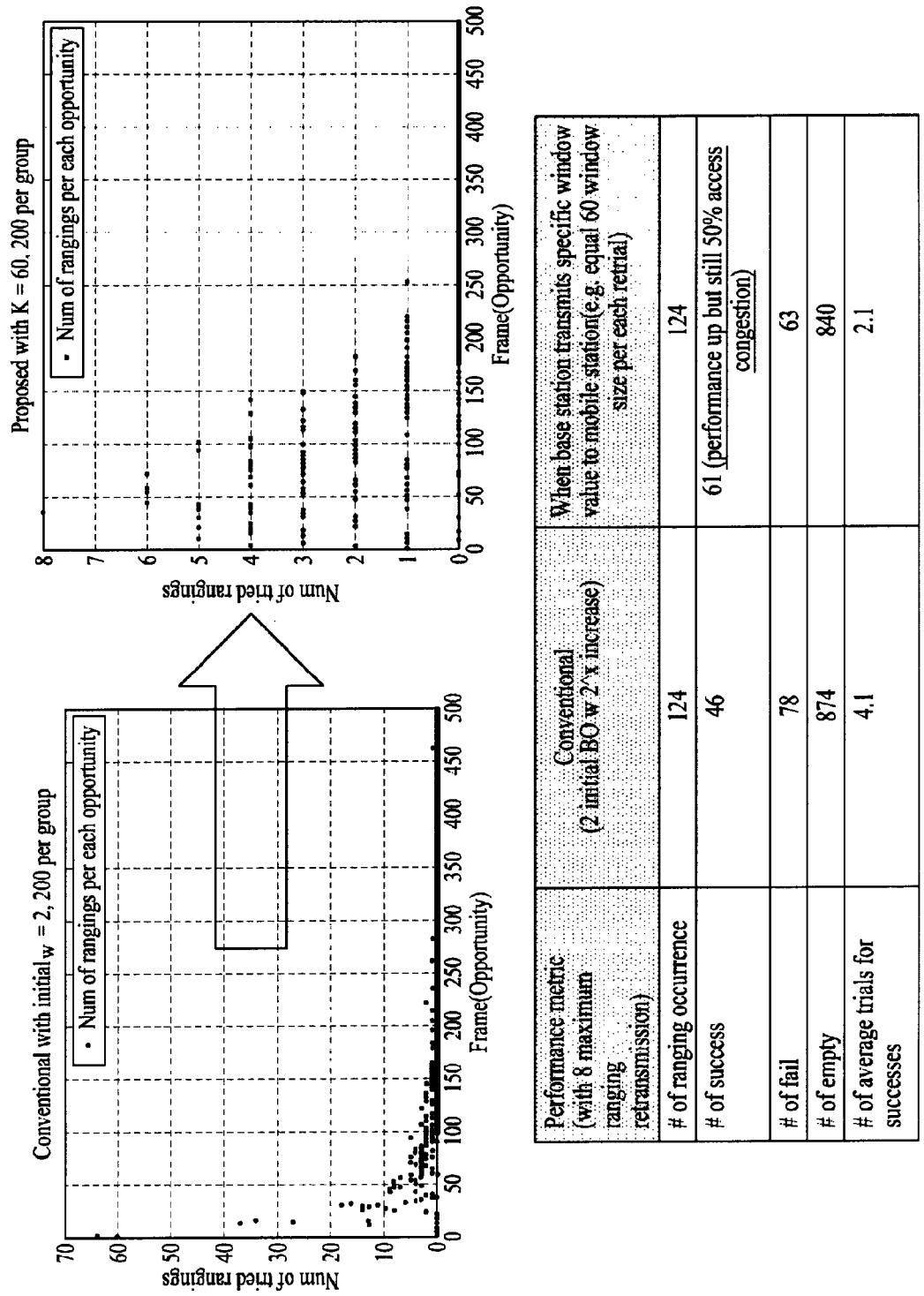
FIG. 4 illustrates results of experiments with respect to conventional random access and random access according to a first method of the present invention.

FIG. 4 illustrates results of experiments with respect to conventional random access and random access according to the first method of the present invention. The first method according to the present invention is applicable to a case in which communication load is heavy due to a considerably large number of mobile stations. As M2M device application types such as a smart meter are diversified, the number of M2M communication devices can be remarkably increased compared to the number of general communication devices. If lots of M2M devices communicate with a base station through a conventional one-to-one communication scheme, network overload due to signaling between the M2M devices and the base station is expected. The M2M devices have characteristics that they are in a long sleep mode and attempt to access a network to transmit a small amount of data within a short time. Accordingly, when more than 30,000 M2M devices, such as smart meters, in a group are simultaneously operated, collision occurs in the conventional BEB scheme. Therefore, the present invention proposes a method of increasing the initial backoff window size for random access in order to reduce collision.

For graphs of FIG. 4, it is assumed that one mobile station group includes 200 devices, the horizontal axis represents opportunity corresponding to one frame, and ranging is successfully performed with one opportunity per frame. The vertical axis of the graphs represents the number of ranging retrials.

FIG. 4(a) illustrates a result of an experiment with respect to random access performed under the condition that the initial backoff window size is set to 2 and one mobile station group includes 200 devices.

When the initial backoff window size is set to 2, it can be seen from FIG. 4(a), that distribution is not made and opportunities are concentrated in preceding frames. That is, when the backoff time is randomly determined, a short backoff time is set in many cases. Accordingly, the number of initial ranging retrials reaches approximately 40 and ranging trials of most mobile stations fail due to collision. FIG. 4(b) illustrates a result of an experiment with respect to random access performed under the condition that both the initial backoff window size and a backoff window size for retransmission are set to 60 and one mobile station group includes 200 devices. In this case, distribution is achieved compared to the case of FIG. 4(a) and the number of ranging trials is remarkably reduced. That is, it is possible to reduce the number of collisions occurring during the first ranging trial by increasing the initial backoff window size suitable for mobile stations operating in the conventional one-to-one communication scheme from 2 in consideration of a large number of M2M devices. Accordingly, the probability of success of the initial random access trial can be increased and the number of random access retrials following the initial random access trial can be reduced, to thereby decrease latency. Therefore, the base station can set an appropriate initial backoff window size by estimating the number of M2M mobile stations which access the base station to reduce the number of random access retrials and achieve uniform distribution. It can be seen from FIG. 4 that the number of ranging retrials due to collisions is remarkably reduced, the number of collisions is decreased, and the rate of success increases by 50% when the initial backoff window size k is increased from 2 to 60.

When a mobile station (or mobile stations which belong to an M2M group) attempts network entry/re-entry, the mobile station selects a specific ranging opportunity in a backoff window size randomly (or according to a specific rule) in order to avoid access congestion. At this time, the mobile station can be classified as one group and predetermined groups can simultaneously perform network entry. The base station can adjust a window size for retransmission on the basis of the number of mobile stations which attempt access and the number of mobile station devices which belong to one mobile station group and transmit an initial backoff window size parameter to the mobile station. The mobile station can perform random access using the initial backoff window size parameter received from the base station.

Here, when the mobile station cannot receive a success acknowledgement signal within a predetermined time although it has initially transmitted a ranging signal, the mobile station can attempt access by retransmitting the ranging signal.

The BEB algorithm which randomly selects an opportunity in a window size increased by scaling the initial backoff window size by 2^x (x denotes a parameter regarding the number of retrials) has been described above.

The second method of the present invention attempts retransmission while reducing the backoff window size signaled by the base station, distinguished from the conventional BEB algorithm. According to the second method of the present invention, the base station transmits information representing an initial backoff window size of greater than 2 to a mobile station as in the first method. In addition, the base station determines one initial value (referred to as K) and transmits this value to the mobile station. Distinguished from the first method in which the initial backoff window size equals the backoff window size for retransmission, the second method of the present invention reduces the backoff window size whenever the number of retrials increases. For example, the mobile station can calculate a window size P in which an opportunity will be selected for retrial according to the following math figure.

$$P=k/(B^x)$$ [Math Figure 2]

Here, B is an integer greater than 1 and x denotes the ranging retransmission count of the mobile station. For example, when B is 2, $P=k/(2^1)$ for the first retransmission and $P=k/(2^2)$ for the second retransmission. When the opportunity selected by the mobile station for retransmission is Q, Q can be represented as follows.

$$Q=n+\text{random\_selection\_of\_opportunity\_between}\ (0\sim P)$$ [Math Figure 3]

Here, n denotes opportunity (backoff time or backoff value) in the event of previous transmission.

It is desirable that the window size in which the opportunity will be selected for retransmission has a value equal to or greater than 2.

When the base station does not set the window size to an exponential factor of 2, P can be set to one of the following three.

P=floor $(K/(2^x))$; The window size is aligned such that it does not exceed a window size boundary set with respect to retransmission.

P=ceil $(K/(2^x))$

P=f$(K/(2^x))$ where f(y) is a function which outputs an exponential factor of maximum 2, which does not exceed y. For example, when K is 300, P corresponds to $2^7=128$ when x=1 and to $2^6=64$ when x=2.

Figure 5:
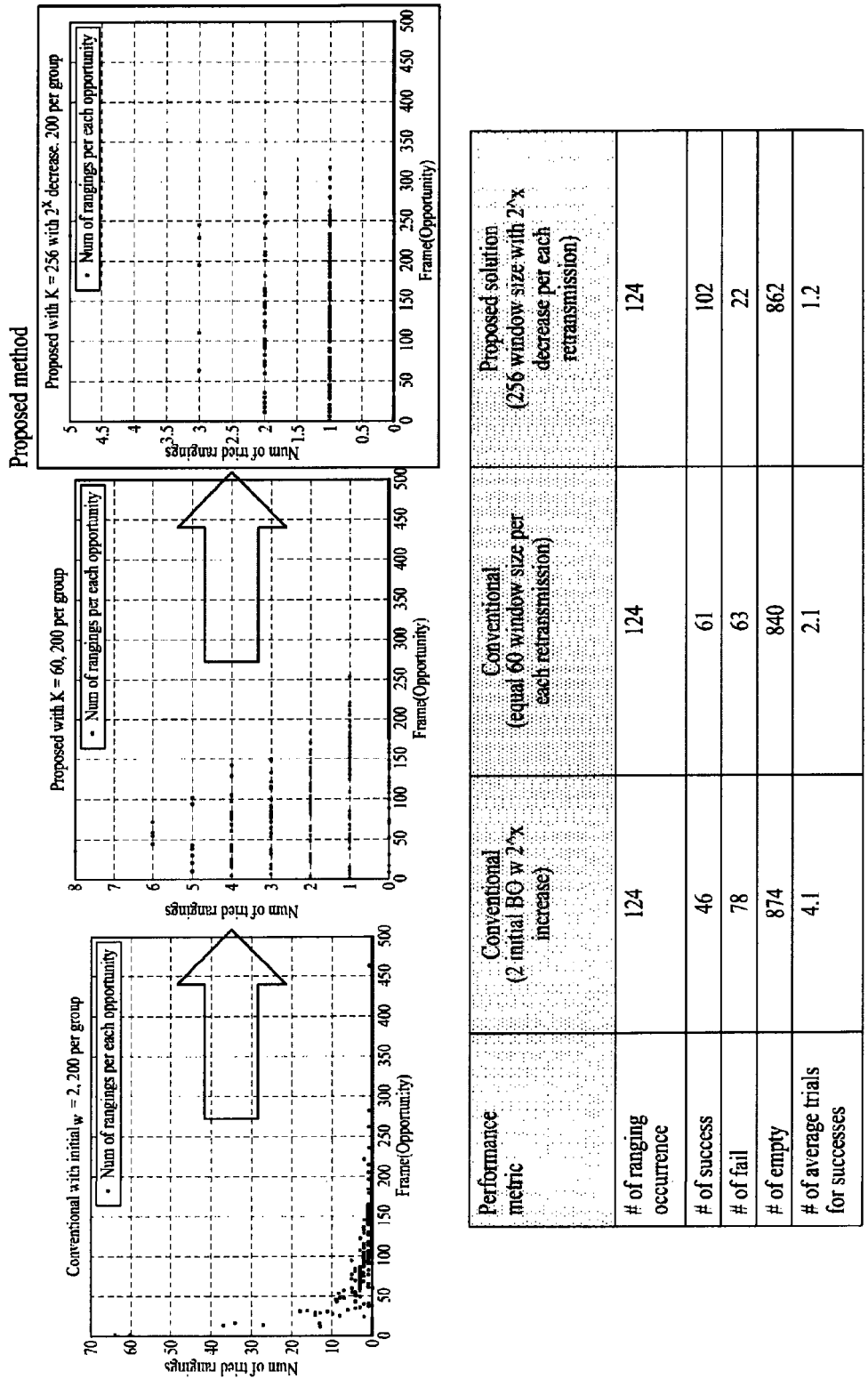
FIG. 5 illustrates results of experiments with respect to conventional random access, random access according to the first method of the present invention, and random access according to a second method of the present invention.

FIG. 5 illustrates results of experiments with respect to conventional random access, random access according to the first method of the present invention, and random access according to the second method of the present invention.

FIG. 5(a) and FIG. 5(b) correspond to FIG. 4(a) and FIG. 4(b), and FIG. 5(c) illustrates a result of an experiment to which the second method of the present invention is applied under the condition that both the initial backoff window size and backoff window size for retransmission in FIG. 5(a) and FIG. 5(b) are set to 60. FIG. 5(c) illustrates a result of an experiment with respect to random access performed under the condition that the initial backoff window size is set to 256 and the backoff window size for retransmission is gradually reduced at the rate of $2^x$ as an inverse exponential backoff window size. In the second method of the present invention, the backoff window size can be set such that x in math figure 1 is represented as a non-negative integer. When the inverse exponential backoff window size is gradually reduced at the rate of $2^x$, distinguished from the case in which the backoff window size is exponentially increased (FIG. 5(a)), significant gain increase can be achieved as illustrated in FIG. 5(c). Referring to FIG. 5(c), a retransmission trial count is maintained as 1 until the number of frames reaches 200, and thus ranging can be successfully performed through one trial. Since random access success can be achieved within three random access retrials, even though the initial backoff window size is set to 256, the system can be implemented within a window of 512 because the second backoff window size is 128 and the third backoff window size is 64. This reduces latency. That is, when the initial backoff window size is set to 256 and the backoff window size for retransmission is reduced, a significant gain increase can be achieved.

Therefore, as shown in the table of FIG. 5, the second method according to the present invention can obtain a success count of 102, as shown in FIG. 5(c), for the same ranging trials, 124.

The second method according to the present invention increases the initial backoff window size based on the distribution characteristic in which access loads are concentrated in preceding frames and reduces the backoff window size for retransmission according to the characteristic in which the number of access loads distributed in later frames decreases. Furthermore, complexity of implementation can be reduced by inversely applying the conventional method, used to transmit information on the initial backoff window size, to retransmission. That is, the conventional method can be employed while using an inverse exponential backoff window size instead of the exponential backoff window size, to facilitate implementation. The second method of the present invention inversely reduces the backoff window size by an exponent of B (B being a positive integer greater than 1) and sets a large initial backoff window size so as to reduce the number of frames requested for ranging, thereby decreasing a random access retrial count and latency.

The first and second methods of the present invention set the initial backoff window size according to the BEB algorithm, to a specific window value, preferably, a value greater than 2. For the first ranging trial, most ranging procedures are subjected to collision when the initial backoff window size is 2 as in the conventional BEB scheme. Accordingly, in the first and second methods proposed by the present invention, the base station detects the number of mobile stations capable of accessing the base station, adjusts the initial backoff window size, includes the adjusted initial backoff window size in a paging message, and transmits the paging method to the mobile stations. The number of ranging trials performed when a ranging acknowledgement message is not received can be reduced by increasing the initial backoff window size compared to the conventional initial backoff window size. That is, a mobile station attempts ranging in an appropriate initial backoff window size to achieve successful access within 3 ranging trials in the base of FIG. 5(c).

Tables 1 to 9 show experimental examples for increasing success rate with a small delay by varying a paging cycle and an access rate when the window size is set. The access rate is 40/s in Tables 1, 2 and 3, and the paging cycle is in Table 1, 2.5 s in Table 2, and 5 s in Table 3.

TABLE 1

| Terms | A | B |
|---|---|---|
| Targeting success rate | Over 99% | Over 99% |
| Initial backoff window size | 4 | 64 |
| Average delay(required frames) | 0.53 s(102 frames) | 0.3 s(60 frames) |

TABLE 2

| Terms | A | B |
|---|---|---|
| Targeting success rate | Over 99% | Over 99% |
| Initial backoff window size | 8 | 256 |
| Average delay(required frames) | 1.23 s(246 frames) | 0.98 s(196 frames) |

TABLE 3

| Terms | A | B |
|---|---|---|
| Targeting success rate | Over 99% | Over 99% |
| Initial backoff window size | 16 | 512 |

TABLE 3-continued

| Terms | A | B |
|---|---|---|
| Average delay(required frames) | 2.55 s(510 frames) | 1.96 s(392 frames) |

The access rate is 60/s in Tables 4, 5 and 6, and the paging cycle is in Table 4, 2.5 s in Table 5, and 5 s in Table 6.

TABLE 4

| Terms | A | B |
|---|---|---|
| Targeting success rate | Over 98% | Over 98% |
| Initial backoff window size | 16 | 128 |
| Average delay(required frames) | 1.22 s(244 frames) *0.99 s w94% | 0.58 s(116 frames) |

TABLE 5

| Terms | A | B |
|---|---|---|
| Targeting success rate | Over 98% | Over 98% |
| Initial backoff window size | 128 | 256 |
| Average delay(required frames) | 4.51 s(902 frames) *2.36 s w91% | 1.17 s(234 frames) |

TABLE 6

| Terms | A | B |
|---|---|---|
| Targeting success rate | Over 98% | Over 98% |
| Initial backoff window size | 128 | 512 |
| Average delay(required frames) | 7.64 s(1528 frames) *4.74 s w91% | 2.33 s(466 frames) |

The access rate is 80/s in Tables 7, 8 and 9, and the paging cycle is in Table 7, 2.5 s in Table 8, and 5 s in Table 9.

TABLE 7

| Terms | A | B |
|---|---|---|
| Targeting success rate | Over 90% | Over 90% |
| Initial backoff window size | 128 | 256 |
| Average delay(required frames) | 4.16 s(832 frames) | 1.55 s(310 frames) |

TABLE 8

| Terms | A | B |
|---|---|---|
| Targeting success rate | Over 90% | Over 90% |
| Initial backoff window size | 128 | 512 |
| Average delay(required frames) | 9.74 s(1948 frames) | 2.86 s(572 frames) |

TABLE 9

| Terms | A | B |
|---|---|---|
| Targeting success rate | Over 90% | Over 90% |
| Initial backoff window size | 128 | 1024 |
| Average delay(required frames) | 15.3 s(3060 frames) | 5.57 s(1114 frames) |

As shown in Tables 1 to 9, the present invention can achieve significant technical effects compared to the conventional BEB scheme.

Referring to Tables 1 to 9, the access rate was set to various values of 40/s, 60/s, and 80/s and the paging cycle was set to various values of 1 s, 2.5 s and 5 s and a targeting success rate according to the initial backoff window size was analyzed. The above-mentioned BEB algorithm, corresponds to A and the method of reducing the backoff window size and adjusting the backoff window start time corresponds to B. As shown in Tables 1 to 9, in the method B of reducing the backoff window size, a paging trial overlapping the next paging interval does not occur in the case of access rates of 40/s and 60/s. An overlapping paging trial is called spill over. In order to prevent overlapped paging from occurring, the initial backoff window size is set to a large value and a paging interval start point for ranging retransmission is signaled with the backoff window size gradually decreased so as to reduce collision with mobile stations according to the next ranging retransmission. Contention increases as the access rate increases. Accordingly, the base station needs to set an appropriate backoff window size based on the number of mobile station devices. When random access is successfully made within 2 or 3 random access trials in the initial backoff window size set by the base station, latency according to random access retrial can be decreased. Referring to Tables 1 to 9, scheme B can reduce average delay, that is, the number of required frames, as compared to scheme A to accomplish the same success rate at the same access rate and the same paging cycle. Even when the initial backoff window size is larger in the case of B than in the case of A, the number of requested frames after the initial backoff window size is set is reduced, and thus scheme B can reduce a random access retrial count and latency.

However, at 60/s, scheme A increases the number of requested frames and generates spill-over due to overlapped paging. A description will be given of a third method for preventing spill-over according to the present invention.

Figure 6:
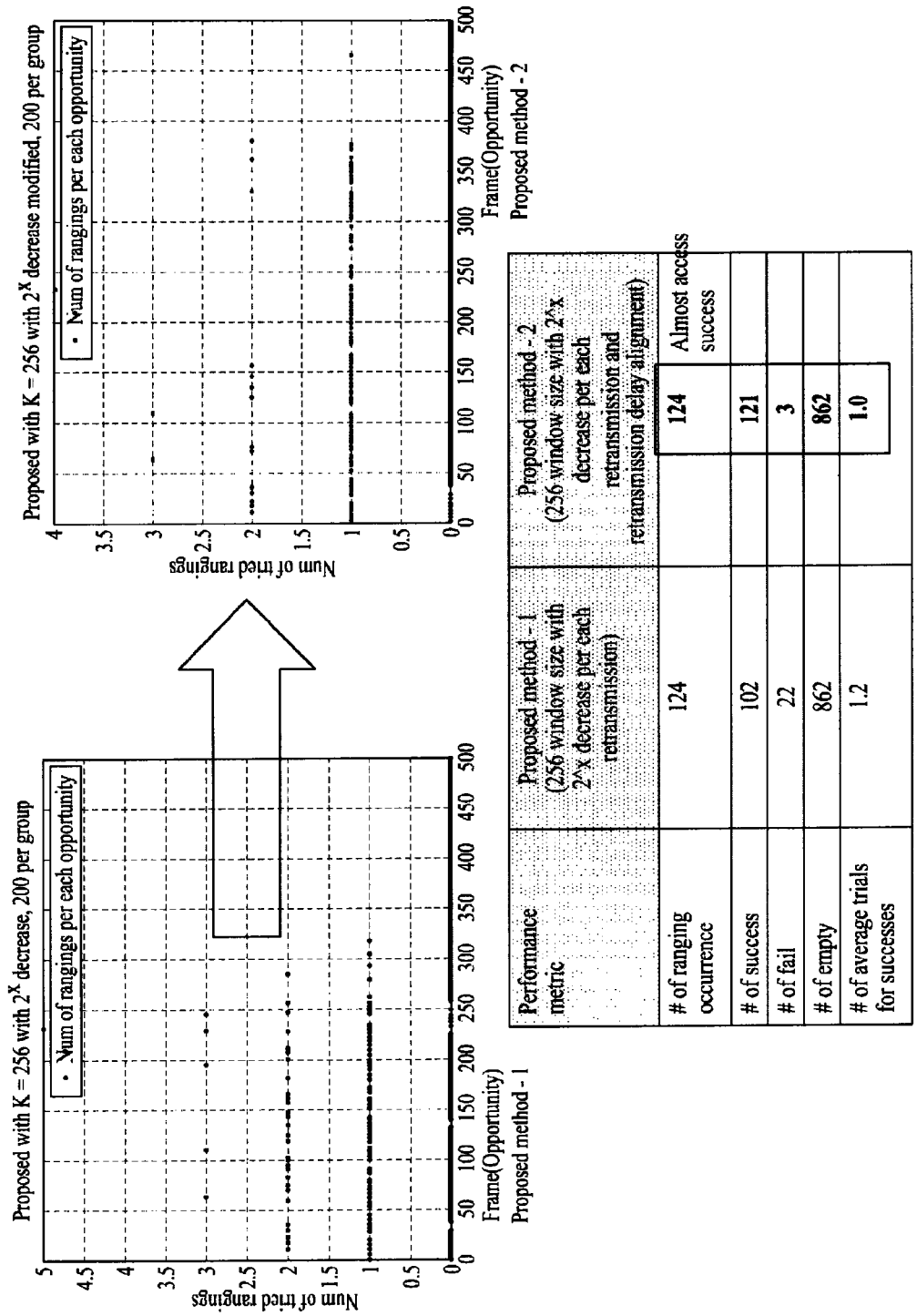
FIG. 6 illustrates results of experiments according to a third method for aligning a random access backoff window start point according to the present invention.

FIG. 6 illustrates results of an experiment with respect to the third method of the present invention according to random access backoff window start time adjustment.

*109 To reduce spill-over which causes an overlapped frame as shown in Tables 1 to 9, the present invention proposes a method for aligning the backoff window start time.

The third method of the present invention can optimize the second method proposed by the present invention. The third method determines a start point of an i-th backoff window region in consideration of an end point of an (i−1)th backoff window region.

According to the aforementioned first and second methods, when transmission fails at a specific opportunity within the backoff window size, an opportunity within the next window size is selected on the basis of the transmission failure time. In the case that the window start time for retransmission is determined in this manner in the second method of the present invention and transmission fails at a preceding opportunity of the backoff window, when a mobile station selects an opportunity within a reduced window size for the next transmission, the probability that the transmission overlaps with the first transmission of another mobile station at an opportunity at the rear part of the backoff window is high. For example, when the initial backoff window size is set to 256, a random access time can be randomly selected within the window of 256 during a ranging procedure. If random access fails due to collision when the random access is attempted at the $64^{th}$ frames of 256 frames, which corresponds to the front part of the backoff window, random access is retried. The second window backoff size for the following random access becomes $156/(2^1)$, that is, 128. Accordingly, when retransmission random access is performed within the window with 128 frames after 64 frames in which the first random access is attempted, this random access retrial may overlap with the initial random access trial performed by another mobile station within the initial backoff window size of 256 (for example, random access trial performed at $160^{th}$ frame) to further increase collision probability. Therefore, the present invention proposes a method of determining a backoff window size start point in order to prevent window regions in which the second random access and the first random access are made from overlapping each other. In the above-mentioned example, when random access at the $64^{th}$ frame fails due to collision, the backoff window sizes tart point is set to the $256^{th}$ frame such that the next random access is attempted at a time after the 256 frames.

Therefore, the third method applies a time gap corresponding to a specific delay for the next retransmission in order to avoid overlapping. When the opportunity selected by a mobile station for retransmission is Q, Q is represented by the following math figure.

$$Q=n+\text{random\_selection\_of\_opportunity\_between} \\ (0{\sim}P)+\text{time\_gap}, \text{time\_gap}=(\text{window\_size}-n\_ \\ \text{of\_previous\_transmission}) \quad \text{[Math Figure 4]}$$

In math figure 4, n denotes the opportunity of previous transmission. Here, the time gap can be set as math figure 4 considering a mobile station which selects the last opportunity of the window for the first transmission.

In other words, the opportunity selected by the mobile station for retransmission, Q, can be represented by the sum of the opportunity (a value selected from 0 to P) randomly selected in the window size P and the window size of previous transmission, $$\sum_{k=0}^{k=i-1} P_k.$$

The third method proposed by the present invention can set $$\sum_{k=0}^{k=i-1} P_k$$

as the backoff window start point such that the mobile station can attempt ranging at the backoff window start point. When the window size of previous transmission is added, the random access trial does not collide with a random access trial in the window size of previous transmission, which is performed by another mobile station.

P can be set using the aforementioned second method, and Q is set per transmission.

When the time gap is set as described above, $Q_i$ of i-th retransmission can be represented as follows (sum of Qo fall previous transmissions).

$$Q_i = \sum_{k=0}^{k=i-1} P_k + \text{random\_selection\_under\_}P_i\text{\_window\_size} \quad \text{[Math Figure 5]}$$

Here, $P_0$ denotes the initial backoff window size K, and $P_i$ denotes the i-th backoff window size.

$$\sum_{k=0}^{k=i-1} P_k$$

an be regarded as the backoff window start point of the i-th retransmission. By setting the backoff window start point in this manner, it is possible to prevent collision due to ranging retrial according to overlap with the first transmission of a different mobile station at a later opportunity. The base station can set the initial backoff window size and signal it to the mobile station. The mobile station can calculate a backoff window size for retransmission and a backoff window start point using the initial backoff window size and perform a random access procedure.

Here, a specific processing delay factor of the system can be considered. For example, a time ranging from when a ranging code is transmitted to when a ranging acknowledgment (AAI-RNG-ACK, or RNG-SCK in a 802.16e system) message is received is $T_{31}$ ($T_3$ in 802.16e). The present invention can determine the backoff window start time in consideration of $T_{31}$ as follows.

$$\text{backoff\_window\_start\_point}(i) = \quad \text{[Math Figure 6]}$$
$$\max\left(\sum_{k=0}^{k=i-1} P_k, Q_{i-1} + T_{31}\right)$$

Since random access exceeding the backoff window size for the i-th retransmission may be performed due to a delay according to the time taken to receive the ranging acknowledgement message, collision due to message reception time delay can be avoided by setting the backoff window start point to a maximum value between the sum of backoff window sizes of 0-th to (i−1)th retransmissions, $$\sum_{k=0}^{k=i-1} P_k,$$

and the sum of the (i−1)th ranging opportunity $Q_{i-1}$ and $T_{31}$. For example, when the sum of backoff window sizes of 0th to (i−1)th retransmissions is 384, the (i−1)th ranging opportunity $Q_{i-1}$ corresponds to 370, and delay is greater than 14 frames, a random access trial for the (i−1)th retransmission and a random access trial for the i-th retransmission may collide with each other. Accordingly, overlap occurrence can be avoided by setting the i-th backoff window start point to a maximum value between the sum of backoff window sizes of 0th to (i−1)th retransmissions, $$\sum_{k=0}^{k=i-1} P_k,$$

and the sum of the (i−1)th ranging opportunity $Q_{i-1}$ and $T_{31}$.

Therefore, the i-th opportunity $Q_i$ is set as follows.

$$Q_i = \max\left(\sum_{k=0}^{k=i-1} P_k, Q_{i-1} + T_{31}\right) + \quad \text{[Math Figure 6]}$$
$$\text{random\_selection\_under\_}P_i\text{\_window\_size}$$

Figure 7:
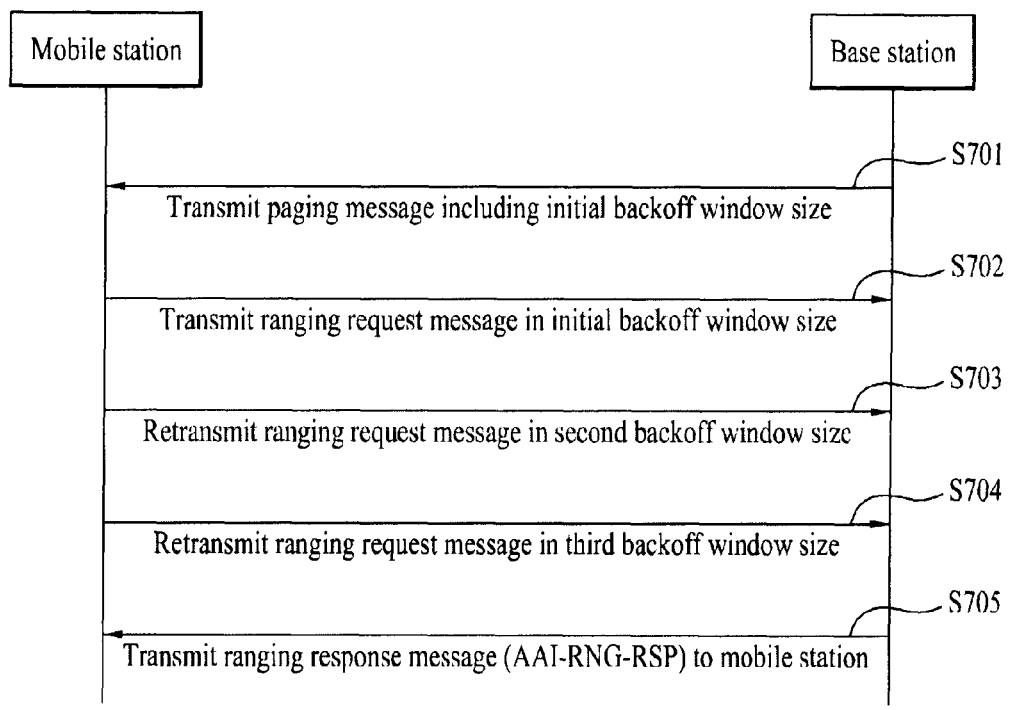
FIG. 7 is a flowchart illustrating a random access method according to an embodiment of the present invention.

In math figure 7, $P_0$ denotes the initial backoff window size K, $P_i$ denotes the i-th backoff window size, and $$\max\left(\sum_{k=0}^{k=i-1} P_k, Q_{i-1} + T_{31}\right)$$

can be regarded as the backoff window start point of the i-th retransmission.

The present invention proposes a fourth method which adaptively supports the BEB that is a conventional backoff mechanism, the first method, the second method and/or the third method of the present invention. When the BEB and the second method of the present invention coexist, a wireless communication system can be implemented such that the method of increasing an exponential backoff window size with factor 2 for ranging retry and the method of reducing the backoff window size with a specific factor for ranging retry can coexist according to a specific system environment. The base station can transmit a signal indicating a backoff window size suitable for the system environment of each mobile station. The base station can control a backoff mechanism used by a mobile station by including a ranging backoff window indicator in a paging message, a registration request message or a registration response message and transmitting the message including the ranging backoff window indicator to the mobile station. For example, the base station can signal the mobile station such that the mobile station uses an increasing mechanism which increases the backoff window size by setting the ranging backoff window indicator having 1 bit to 0b0 and signal the mobile station such that the mobile station uses a decreasing mechanism which decreases the backoff window size by setting the ranging backoff window indicator to 0b1. The base station expects that the mobile station will transmit a ranging signal according to the above-mentioned mechanisms. Accordingly, the base station receives a ranging signal transmitted by the mobile station according to an embodiment of the present invention within the backoff window according to an embodiment of the present invention.

While one backoff mechanism is applied to H2H devices, there are various application types for M2M devices and the M2M devices can operate in groups. The ranging backoff window size can be set using the decreasing mechanism for a group of M2M devices such as smart meters and the conventional BEB mechanism is applied to an M2M device group having a small number of devices to perform random access with an increased backoff window size. By adaptively setting a random access scheme in this manner, it is possible to reduce a potential collision count, decrease latency and provide a random access backoff method. The mobile station and the base station can negotiate ranging backoff mechanisms applicable to M2M devices through an AAI-REG-REQ/RSP to set a backoff window size. The base station can determine a ranging backoff mechanism applied to each M2M device for each paging group. Both the increasing mechanism and the decreasing mechanism can be employed as the ranging backoff mechanism according to characteristics of the mobile station (or M2M device). According to the present invention, the base station can include a ranging backoff window indicator which indicates the ranging backoff mechanism applicable to the environment of the mobile station in a paging message and transmit the paging message to the mobile station. Furthermore, the mobile station and the base station can negotiate whether the mobile station can support the ranging backoff decreasing mechanism through a registration request message or a registration response message including the ranging backoff window indicator.

When the number of mobile stations is small, the mobile stations have to use the conventional BEB mechanism when requested to use ranging for different purposes. That is, each mobile station can align the backoff window size according to BEB and use the system during a bandwidth request ranging procedure for requesting an uplink band when traffic to be transmitted from the mobile station to the base station is generated. Therefore, it is possible to implement a random access scheme adapted to the system.

The base station can transmit the ranging backoff window indicator over a channel which signals the initial backoff window size, or include the ranging backoff window indicator in a paging message (AAI-PAG-ADV message in a 802.6m system) and transmit the paging message including the ranging backoff window indicator.

A ranging backoff window indication field may be adaptively applied in one system and implemented by a desired method of an operator.

FIG. 7 is a flowchart illustrating a random access backoff method according to an embodiment of the present invention. A base station transmits a paging message including an initial backoff window size to a mobile station (S701). The mobile station performs a ranging procedure on the basis of the initial backoff window size (S702). The mobile station retransmits a ranging request message to the base station on the basis of a second backoff window size when the mobile station does not successfully receive a ranging acknowledgement message from the base station (S703). When the mobile station fails to receive the ranging acknowledgement message from the base station again, the mobile station retransmits the ranging request message to the base station on the basis of a third backoff window size (S704). When the ranging request message according to a random access is successfully transmitted, the base station transmits a ranging response message to the mobile station (S705).

The embodiments of the present invention can be applied to the mobile station 100 and the base station 150 illustrated in FIG. 1. The mobile station 100 of FIG. 1 may be an H2H device or an M2M device. Referring to FIG. 1, the processor 120 of the mobile station 100 controls the receiver 112 to receive a message including backoff window information from the base station 150. The processor 120 of the mobile station 100 is configured to perform a ranging procedure on the basis of the backoff window information. The backoff window information includes information indicating a 0-th backoff window size $K_0$. The processor 120 is configured to determine the x-th backoff window size $K_x$ according to $K_x=K_0/(2^x)$ where x denotes a ranging retry count. The processor 120 can control the transmitter 111 to retransmit a ranging request message on the basis of the backoff window information when the mobile station 100 does not receive a ranging response message. In addition, the processor 120 can control the receiver 110 to receive the ranging response message in response to the ranging request message to the base station 150, and perform a network entry procedure to the base station 150 on the basis of the ranging response message. The x-th backoff window size can have a value greater than 2. The message can include a ranging backoff window indicator which indicates an increase or decrease in the backoff window size for ranging retransmission. The processor 120 can increase the backoff window size for ranging retransmission when the ranging backoff window indicator indicates a backoff window size increase and reduce the backoff window size for ranging retransmission when the ranging backoff window indicator indicates a backoff window size decrease. Furthermore, the processor 120 can control the receiver 112 to receive a message including the backoff window information from the base station 150. The processor 120 is configured to determine the x-th backoff window for x-th (x being a non-negative integer) ranging transmission using the backoff window information. Moreover, the processor 120 controls the transmitter 111 to transmit the x-th ranging signal to the base station 150 within the x-th backoff window and is configured to determine the (x+1)th backoff window start point in consideration of the x-th backoff window end point.

Alternatively, the processor 120 can be configured to set an (x+1)th backoff window start point to a larger value from the sum of the 0-th backoff window size to the x-th backoff window size, and the sum of the x-th ranging transmission time and a predetermined time.

The processor 170 of the base station 150 can control the transmitter 161 of the base station 150 to transmit a paging message including backoff window information to the mobile station 100 and be configured to perform a ranging procedure on the basis of the backoff window information. The processor 170 of the base station 150 can control the receiver 162 to receive the ranging request message from the mobile station 100. In addition, the processor 170 can control the transmitter 161 to transmit a ranging response message in response to the ranging request message to the mobile station 100.

The processor 170 can control the receiver 162 to receive the x-th ranging transmission from the mobile station 100 within an x-th backoff window determined using the backoff window information and control the receiver 162 to receive the (x+1)-th ranging transmission from the mobile station 100 within an (x+1)th backoff window determined using the backoff window information. Furthermore, the processor 170 can be configured to determine the start point of the (x+1)th backoff window in consideration of the end point of the x-th backoff window.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for ranging transmission at a mobile station, the method comprising:
receiving backoff window information indicating an initial backoff size $K_0$ from a base station;
determining an $x^{th}$ backoff window size $K_x$ according to $K_x=K_0/(2^x)$, wherein the x is a number of ranging retransmissions; and
performing the ranging transmission within the backoff window size $K_x$.

2. The method according to claim 1, wherein the backoff window information is included in a paging message.

3. The ranging transmission method according to claim 1, wherein the initial backoff size $K_0$ is greater than 2.

4. A mobile station configured to perform ranging transmission to a base station in a wireless communication system, the mobile station comprising:
a receiver;
a transmitter; and
a processor configured to control the receiver,
wherein the processor is configured to control the receiver to receive backoff window information indicating an initial backoff size $K_0$ from the base station and to determine an $x^{th}$ backoff window size $K_x$ according to $K_x=K_0/(2^x)$, wherein the x is a number of ranging retransmissions; and to perform the ranging transmission within the backoff window size $K_x$.

5. The mobile station according to claim 4, wherein the backoff window information is included in a paging message.

6. The mobile station according to claim 4, wherein the initial backoff size $K_0$ is greater than 2.

* * * * *